Jan. 26, 1965 W. MAAG 3,167,704
CURRENT CONTROL CIRCUIT ARRANGEMENT
Filed Sept. 8, 1960
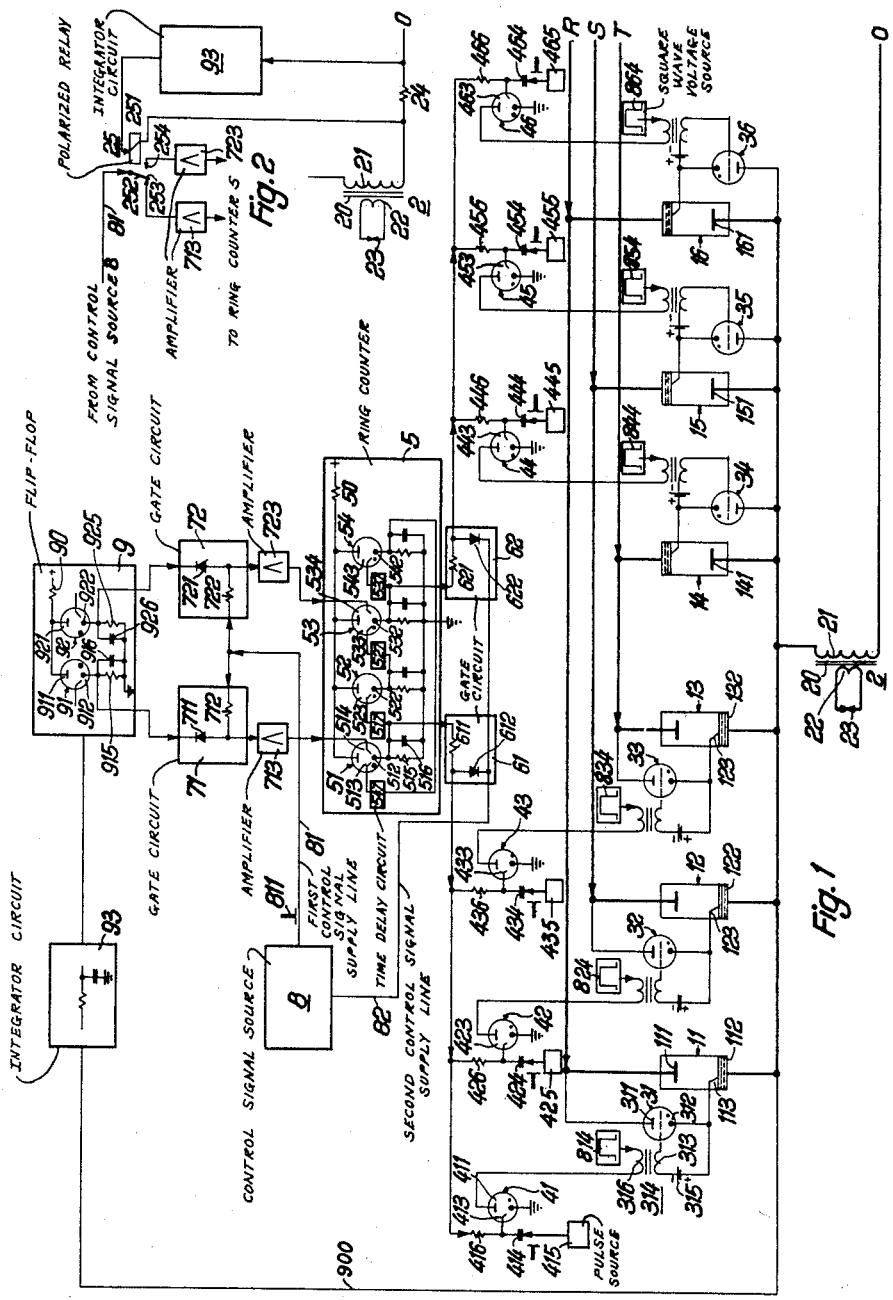
Inventor:
Walter Maag
by: Michael S. Striker
Attorney United States Patent Office 3,167,704
Patented Jan. 26, 1965

3,167,704
CURRENT CONTROL CIRCUIT ARRANGEMENT
Walter Maag, Geroldswil, Switzerland, assignor to H. A. Schlatter Aktiengesellschaft, Zollikon, Zurich, Switzerland
Filed Sept. 8, 1960, Ser. No. 54,714
Claims priority, application Switzerland, Sept. 9, 1959, 78,009
6 Claims. (Cl. 323—58)

The present invention relates to a circuit arrangement for controlling current. More particularly, the invention relates to a circuit arrangement for controlling current in a power or power supply circuit converting three-phase A.C. to a single-phase A.C., which circuit arrangement is particularly suitable for welding apparatus.

In the circuit arrangement of the present invention, two rectifier or phase converting circuits are provided for alternate rectification or phase conversion of each phase of the polyphase current, and the operation of said rectifier or phase converting circuits is controlled by a control circuit in accordance with the phase or half cycle polarity of the single-phase current.

An object of the present invention is to provide a circuit arrangement for preventing overcurrents in a power circuit. Such overcurrents occur, when the power circuit is enerized, due to the remanence or residual magnetism of the core of a transformer connected in the single-phase circuit. The transformer may comprise, for example, the transformer of welding apparatus. As is known, the overcurrents prevented by the circuit arrangement of the present invention develop when the power circuit is energized at a time when the momentary magnitude of voltage corresponds to an induction change or magnetization which is approximately equal to the residual induction or residual or remanent magnetization from the next preceding energization of said power circuit. In such an instance, the induction or magnetization of the core of the transformer at the moment of energization of the power circuit is changed only slightly, no self-induced voltage develops, so that the current at the moment of energization is determined essentially solely by the ohmic resistance of the circuit and greatly exceeds the magnitude necessary for the actual operation.

It is known that the generation of such overcurrents may be prevented by energizing the transformer during a half cycle of opposite polarity from the polarity of the half cycle at which the transformer was deenergized. However, this necessitates that the interval between the deenergization and energization correspond to an even number of half cycles.

The present invention permits the interrupting of the single-phase current obtained from a polyphase current at intervals of any desired length and still prevents the generation of overcurrents at the time of energization of the power supply circuit.

In the circuit arrangement of the present invention, the control circuit comprises a ring counter circuit with an even number of stages each of which is controlled by a time delay circuit. One of the two diametrically opposed stages of the ring counter circuit releases the ignition signals for the rectifier circuit for one half cycle (one polarity) of the single-phase current, and the other of the diametrically opposed stages releases the ignition signals for the rectifier circuit for the other half cycle (the opposite polarity) of the single-phase current. Each of the stages of the ring counter circuit is connected by switching means to a control signal supply line of a control signal source and each of said stages may be set in operation by a signal which serves to switch on the single-phase current. The switching means conductively connects, under the influence of each half cycle of the single-phase current, the control signal supply line with a control element of that one of the two stages of the ring counter circuit which releases the ignition signals for the rectifier circuit of the opposite half cycle.

In accordance with one embodiment of the circuit arrangement of the present invention, the aforementioned switching means comprises a polarized relay which is energized by the single-phase current and which is provided with a make-break contact. The make-break contact connects the control signal supply line during each half cycle of the single-phase current with that one of the two stages of the ring counter circuit which releases the ignition signals for the rectifier circuit of the opposite half cycle of the single-phase current.

In accordance with another embodiment of the circuit arrangement of the present invention, each of the two diametrically opposed stages of the ring counter circuit is connected by a gate circuit to the control signal supply line. A bistable device, which depends on the polarity of the half cycles of the single-phase current, opens, under the influence of each half cycle of the single-phase current, that gate circuit which is provided between the control signal supply line and that stage of the ring counter circuit which releases the ignition signals for the rectifier circuit for the half cycle of opposite polarity. The bistable device may comprise, for example, a bistable multivibrator or flip-flop circuit.

The aforementioned switching means are preferably connected with the circuit of the single-phase current by means which does not transmit self-induced voltages developing in the single-phase current during the energization of the power supply circuit. The aforementioned means may comprise an integrator circuit.

In order that the present invention may be readily carried into effect, it will now be described with reference to the accompanying drawing, wherein:

FIG. 1 is a schematic diagram of an embodiment of the current control circuit arrangement of the present invention; and FIG. 2 is a schematic diagram of another embodiment of a portion of the circuit arrangement of FIG. 1.

In FIG. 1, the three conductors of a three-phase input network of a power supply circuit are indicated by R, S and T, respectively. The conductor R is coupled to one end of primary winding 21 of a transformer 2 through two ignitrons 11 and 16 which are connected in antiparallel arrangement. The transformer 2 may comprise, for example, a welding transformer for supplying current from the power supply circuit to welding apparatus. The conductor S is coupled to said one end of the primary winding 21 through ignitrons 12 and 15 which are connected in antiparallel arrangement. The conductor T is coupled to said one end of the primary winding 21 through two ignitrons 13 and 14 which are connected in antiparallel arrangement. As shown, the said one end of the primary winding 21 of the transformer 2 is connected to the cathodes 112, 122 and 132 of the ignitrons 11, 12 and 13, respectively, and to the anodes 141, 151 and 161 of the ignitrons 14, 15 and 16, respectively. The ignitrons 11, 12 and 13 comprise a rectifier or phase converting circuit for converting the three-phase A.C. to single-phase A.C. during the positive half cycle of the single-phase A.C. and the ignitrons 14, 15 and 16 comprise a rectifier or phase converting circuit for converting the three-phase A.C. to single-phase A.C. during the negative half cycle. The other end of the winding 21 of the transformer 2 is connected to the neutral point O of the three-phase network. The transformer 2 has a core 20 and a secondary winding 22 which may feed, for example, a welding circuit or welding apparatus 23. Anode 111 of the ignitrons 11 is connected to anode 311 of a thyratron 31, and ignition electrode 113 of the ignitron 11 is connected to cathode 312 of the thyratron 31. Secondary winding 313 of a transformer 314 is connected in the grid circuit of the thyratron 31 in series with a source 315 of grid bias voltage. One terminal of primary winding 316 of the transformer 314 is connected to anode 411 of a cold-cathode tube 41. The other terminal of the primary winding 316 of the transformer 314 receives a square wave voltage which is in phase with the anode voltage of the thyratron 31 and with the anode voltage of the ignitron 11. The square wave voltage applied to the other terminal of the voltage primary winding 316 of the transformer 314 is provided by a source of square wave voltage 814, which source may comprise any suitable square wave generating means.

The ignitrons 12, 13, 14, 15 and 16 are connected to thyratrons 32, 33, 34, 35 and 36, respectively, each such connection including a transformer and a source of grid bias voltage, as well as a cold cathode tube 42, 43, 44, 45 and 46, respectively, and a source of square wave voltage 824, 834, 844, 854 and 864, respectively, which is in phase with the anode voltage of the respective thyratron and ignitron, in the same manner in which the ignitron 11 is connected to the thyratron 31 and in the same manner of connection as the transformer 314 and the source of grid bias voltage 315, as well as the cold cathode tube 41 and the square wave voltage source 814.

Ignition electrode 413 of the cold cathode tube 41 is connected through a capacitor 414 to a pulse source 415. The pulse source 415 may comprise any suitable pulse generating means which produces pulses in an adjustable phase position with respect to the single-phase current. The pulses produced by the pulse source 415 and applied to the capacitor 414 aid in controlling the production of the single-phase current by the power supply circuit. In analogous manner, the ignition electrodes of the cold cathode tubes 42, 43, 44, 45 and 46 receive pulses from pulse sources 425, 435, 445, 455 and 465, respectively. However, each of the tubes 41, 42, 43, 44, 45 and 46 will ignite only if, in addition to the aforementioned pulses, there is a positive bias or preliminary voltage on the respective ignitron electrodes 413, 423, 433, 443, 453 and 463. The bias or preliminary voltage is produced in a manner described hereinafter and is respectively applied to said ignition electrodes through resistances 416, 426, 436, 446, 456 and 466.

The phase converting control which controls the ignitrons 11, 12, 13, 14, 15 and 16 in accordance with the frequency of the single-phase current comprises a ring counter circuit 5. The ring counter circuit 5 contains four cold cathode tubes 51, 52, 53 and 54, each of which is connected to a source of positive potential through a common resistance 50. The cathode of each of the cold cathode tubes 51, 52, 53 and 54 is connected to a source of negative potential, such as, for example, a point at ground potential, through a resistance which is shunted by a capacitor. Thus, for example, cathode 512 of the cold cathode tube 51 is connected to the source of negative potential through a resistance 515 which is shunted by a capacitor 516. The cathode 512 of the tube 51 is connected to ignition electrode 523 of the tube 52 through a time delay circuit 517. Cathode 522 of the tube 52 is connected to ignition electrode 533 of the tube 53 through a time delay circuit 527. Cathode 532 of the tube 53 is connected to ignition electrode 543 of the tube 54 through a time delay circuit 537. In addition, cathode 542 of the tube 54 is connected to ignition electrode 513 of the tube 51 through a time delay circuit 547. In this manner, the tubes 51, 52, 53 and 54 form a ring counter circuit. The time delay circuits 517, 527, 537 and 547 each comprise any suitable time delay means, such as, for example, an RC circuit.

In FIG. 1, the tubes 51, 52, 53 and 54 are not shown in an annular arrangement in order to maintain the clarity of the drawing. If the tubes 51, 52, 53 and 54 were to be shown in an annular arrangement, the tubes 51 and 53 and the tubes 52 and 54 would be disposed diametrically opposite each other. The cathode 512 of the tube 51 is connected through a gate circuit 61 and through the respective resistances 416, 426 and 436 with the ignition electrodes 413, 423 and 433 of the tubes 41, 42 and 43, respectively. The gate 61 may comprise, for example, a resistance 611 connected in series in the line between the input and output of said gate and a diode 612 connected in parallel with said line. In an analogous manner, the cathode 532 of the tube 53, which in an annular arrangement of the ring counter circuit 5 would be disposed opposite the tube 51, is connected through a gate 62 and through the respective resistances 446, 456 and 466 with the ignition electrodes 443, 453 and 463 of the tubes 44, 45 and 46, respectively. The gate 62 may comprise, for example, a resistance 621 connected in series in the line between the input and output of said gate and a diode 622 connected in parallel with said line. Since the tubes 41, 42 and 43 are associated with the ignitrons 11, 12 and 13, respectively, whose cathodes 112, 122 and 132, respectively, are in turn connected with the primary winding 21 of the transformer 2, while the tubes 44, 45 and 46 are associated with the ignitrons 14, 15 and 16, respectively, whose anodes 141, 151 and 161, respectively, are connected with the primary winding 21 of the transformer 2, one half cycle of the single-phase current in the transformer 2 corresponds to each one of the diametrically opposed stages of the ring counter circuit 5 and the other half cycle of the single-phase current in the transformer 2 corresponds to the other of the diametrically opposed stages of the ring counter circuit 5.

Each of the two tubes 51 and 53 includes a second ignition electrode 514 and 534, respectively, which is connected to a first control signal supply line 81 of control signal source 8 through a respective amplifier 713 and 723 and a respective gate circuit 71 and 72. The control signal source 8 provides in the control signal supply line 81 a positive control signal or pulse 811 for each energization of the power supply circuit; that is, each time the transformer 2 is energized by the single-phase current.

Each of the gates 71 and 72 comprises a diode 711 and 721, respectively, and a resistance 712 and 722, respectively, and each of said gates is controlled by one of the two stages of a bistable multivibrator 9. The multivibrator 9 preferably comprises a flip-flop circuit of known design which is only partially shown in the drawing of FIG. 1 and which may comprise, for example, two cold cathode tubes 91 and 92 whose anodes 911 and 921, respectively, are connected to a source of positive potential through a common resistance 90. The cathodes 912 and 922, respectively, of the tubes 91 and 92 are connected to a source of negative potential, such as, for example, a point at ground potential, through resistances 915 and 925, respectively, which are respectively shunted by capacitors 916 and 926. The control voltage for the gate 71 is applied to the cathode 912 of the tube 91, and the control voltage for the gate 72 is applied to the cathode 922 of the tube 92.

The flip-flop circuit 9 is connected through an integrator circuit 93 to the single-phase line 900 of the A.C.

output network. The single-phase line 900 connects the cathodes 112, 122 and 132 of the ignitrons 11, 12 and 13, respectively, and the anodes 141, 151 and 161 of the ignitrons 14, 15 and 16, respectively, with each other. By means of the connection through the integrator circuit 93, the flip-flop circuit 9 is controlled in such a way that the tube 92 is made conductive and the tube 91 is made non-conductive upon the occurrence of each positive half cycle of the single-phase current, since the positive half cycles flow through the ignitrons 11, 12 and 13. The tube 91 is made conductive and the tube 92 is made non-conductive upon the occurrence of each negative half cycle of the single-phase current, since the negative half cycles flow through the ignitrons 14, 15 and 16.

The control signal source 8 supplies via a second control signal supply line 82, a positive control voltage or control signal which is retained for the period of time during which the single-phase alternating current should flow. The control voltage in the second control signal supply line 82 controls the gates 61 and 62. The flip-flop circuit 9 and the gates 71 and 72 are included in the overcurrent control means which controls the energization of the ring counter circuit 5.

In explaining the operation of the circuit arrangement of FIG. 1, it is first assumed that the single-phase current is delivered by means of a control signal delivered to the first control signal supply line 81, so that the control signal source 8 only provides a control voltage in the second control signal supply line 82. In the ring counter circuit 5, one of the tubes 51, 52, 53 and 54 is ignited for a period of time and is then extinguished while a second of said tubes is simultaneously ignited and remains ignited for a given period of time. Then, the second tube is extinguished while the third of said tubes is simultaneously ignited for a given period of time, and the fourth of said tubes is then ignited simultaneously with the extinguishing of the third tube. The ignition times of the tubes are determined by the time delay circuits 517, 527, 537 and 547. While the tube 51 is ignited, its cathode 512 has a positive potential which is delivered to the input of the gate 61. Under the influence of the positive control voltage in the second control signal supply line 82, the diode 612 of the gate 61 is maintained polarized in its non-conductive direction so that said gate is open and the potential of the cathode 512 of the tube 51 reaches the ignition electrodes 413, 423 and 433 of the respective tubes 41, 42 and 43 through the resistance 611 and through the respective one of the resistances 416, 426 and 436. Thus, the ignition electrodes of the cold cathode tubes 41, 42 and 43 are initially charged with a positive potential as long as the tube 51 is ignited and as long as the control signal source 8 provides a control voltage in the second control signal supply line 82, whereby the said control voltage opens the gate 61. Each of the tubes 41, 42 and 43 is ignited as soon as it receives a pulse from the pulse source 415, 425 and 435, respectively. The last-mentioned pulse is necessary for the ignition control of said tubes through the respective capacitor 414, 424, and 434, and the said last-mentioned pulse ignites the said tubes if a square wave voltage from the square wave voltage source 814, 824 and 834, respectively, is simultaneously provided in phase with the anode potential of the respective associated thyratron 31, 32 and 33. As soon as the anode current of one of the tubes 41, 42 and 43 is established, the respective one of the thyratrons 31, 32 and 33 is ignited. This produces a positive charge on the associated one of the ignition electrodes 113, 123 and 133 of the ignitrons 11, 12 and 13, respectively, associated with the respective thyratron so that said one of said ignitrons ignites. In this manner, the positive half cycle of the single-phase current is obtained in the transformer 2 from the three-phase lines R, S, T with the help of ignitrons 11, 12 and 13. Since the tubes 52, 53 and 54 of the ring counter circuit 5 are extinguished when the tube 51 is ignited, the cathode 532 of the tube 53 does not have a positive potential so that the ignition electrodes 443, 453 and 463 of the cold cathode tubes 44, 45 and 46, respectively, are not initially charged with a positive potential and these tubes cannot ignite. Thus, the thyratrons 34, 35 and 36 and the ignitrons 14, 15 and 16 associated with the cold cathode tubes 44, 45 and 46 remain extinguished.

When the tube 51 of the ring counter 5 is extinguished (and the tube 52 ignites), the ignition electrodes 413, 423 and 433 of the tubes 41, 42 and 43, respectively, receive no further initial voltage. The tubes 41, 42 and 43 are then extinguished upon termination of the supply of square wave voltage from the square wave voltage sources 814, 824 and 834, respectively. The thyratrons 31, 32 and 33 and the ignitrons 11, 12 and 13 are extinguished in the next step, as soon as the phase voltage of their associated phase drops below the extinguishing voltage of said thyratrons and ignitrons. Thus, the ignitrons 11, 12 and 13 carry anode current even after the extinguishing of the tube 51 until the voltage of the phase with which they are associated drops to the extinguishing voltage of said ignitrons. When the tube 51 in the ring counter circuit 5 is extinguished, the tube 52 is ignited.

The tube 52 is extinguished after a period of time determined by the time delay circuit 527, whereupon the tube 53 is ignited and its cathode 532 becomes positive. The cathode potential of the tube 53 is applied to the ignition electrodes 443, 453, and 463 of the tubes 44, 45 and 46, respectively, because the gate 62 is open since the control voltage in the second control signal supply line 82 maintains the diode 622 polarized in its non-conductive direction. Thus, each of the cold cathode tubes 44, 45 and 46 ignites as soon as it receives its pulse from the pulse sources 445, 455 and 465, respectively, and its square wave voltage from the square wave voltage sources 844, 854 and 864, respectively. Consequently, the thyratrons 34, 35 and 36 associated with the respective cold cathode tube 44, 45 and 46 and the ignitrons 14, 15 and 16 associated with the respective thyratron is then ignited. The ignitrons 14, 15 and 16 conduct the negative half cycle of the single-phase current. After a period of time determined by the time delay circuit 537, the tube 53 is extinguished and the tube 54 is simultaneously ignited. When the tube 53 is extinguished, the initial potential on the ignition electrodes 443, 453, and 463 of the tubes 44, 45 and 46, respectively, disappears. Each of these tubes remains ignited only until the termination of the square wave voltage from the respective square wave voltage sources 844, 854, and 864, and each of the thyratrons 34, 35 and 36 and each of the ignitrons 14, 15 and 16 remains ignited only until the phase potential drops below the extinguishing potential of the respective thyratron and ignitron. After a period of time which is determined by the time delay circuit 547, the tube 54 of the ring counter 5 is extinguished and the tube 51 is simultaneously ignited, whereby the aforedescribed procedure is repeated in that a positive half cycle of the single-phase current is obtained.

Since in each instant one or two of the lines R, S, T has a positive potential with respect to the neutral point O and since two or one of these conductors has a negative potential with respect to the neutral point, the frequency of the single-phase alternating current for all practical purposes can be selected at will by means of the time delay circuits 517, 527, 537 and 547. In welding apparatus of the type utilizing the power supply circuit of the type described, the frequency of the single-phase current as a rule is selected to be lower than the frequency of the polyphase current.

Under the influence of each positive half cycle of the single-phase current, the tube 92 of the flip-flop circuit 9 is conductive and the tube 91 is non-conductive at the same time while, under the influence of each negative half cycle of the single-phase current, the tube 91 is conductive and the tube 92 is simultaneously non-conductive. When the tube 92 is conductive, its cathode 922 has a positive potential which maintains the diode 721 of the gate 72 polarized in its non-conductive direction so that said gate is open. Thus, the gate 72 is open during each positive half cycle of the single-phase alternating current. Simultaneously, the gate 71 is closed, because the diode 711 does not receive from the cathode 912 of the non-conductive tube 91 a voltage sufficient to maintain said diode polarized in its non-conductive direction. The diode 711 is thus polarized in its conductive direction and represents a short circuit for a signal or pulse 811 which may be provided by the first control signal supply line 81. Similarly, under the influence of each negative half cycle of the single-phase current, the gate 72 is closed and the gate 71 is open, because the negative half cycle of the single-phase alternating circuit causes the tube 92 to become non-conductive and causes the tube 91 to become conductive.

When the single-phase alternating current is to be discontinued (that is, when the power supply circuit is to be deenergized), the control voltage in the second control signal supply line 82 is interrupted. As soon as the last-mentioned second control voltage is terminated, the diodes 612 and 622 of the gates 61 and 62, respectively, are no longer subjected to a voltage maintaining them polarized in their non-conductive direction so that said diodes are polarized in their conductive direction and said gates are closed because the said diodes provide short circuits for the positive cathode potential of the tubes 51 and 53, respectively. In such instances, the ignition electrodes 413, 423, 433, 443, 453 and 463 of the cold cathode tubes 41, 42, 43, 44, 45 and 46, respectively, do not receive an initial potential and therefore said tubes cannot be ignited under the influence of pulses from the pulse sources 415, 425, 435, 445, 455 and 465 and of the square wave voltages from the square wave voltage sources 814, 824, 834, 844, 854 and 864. That one of the cold cathode tubes 41, 42, 43, 44, 45 and 46 which is ignited at the time that the control potential from the control signal source 8 is terminated, is extinguished as soon as the square wave voltage applied to its anode circuit is terminated. Thus, none of the thyratrons 31, 32, 33, 34, 35 and 36 and none of the ignitrons 11, 12, 13, 14, 15 and 16 which are controlled by these thyratrons can be ignited and the momentarily ignited thyratron and ignitron are extinguished as soon as the voltage of the phase associated with said thyratron and ignitron drops to the extinguishing voltage of the said thyratron and ignitron. In this manner, the single-phase current is discontinued whereas the flip-flop circuit 9 remains in a condition determined by the polarity of the last half cycle of the single-phase alternating current. If the last half cycle of the single-phase alternating current was of positive polarity, the tube 92 was conductive while the tube 91 was non-conductive and the gate 72 is open and the gate 71 is closed. However, if the last half cycle of the single-phase alternating current was of negative polarity, the tube 91 was conductive and the tube 92 was non-conductive so that the gate 72 was closed and the gate 71 was open.

When the single-phase alternating current is to be provided (that is, when the power supply circuit is to be energized), the control signal source 8 provides a first control signal or pulse 811 in the first control signal supply line 81 and said control signal source also provides a second control signal or pulse in the second control signal supply line 82. The control signal source 8 continues to provide the first and second control signals for the period of energization of the power supply circuit.

If the last half cycle of the single-phase alternating current was a positive half cycle, the tube 91 of the flip-flop circuit 9 is non-conductive and the tube 92 is conductive so that the gate 71 is closed and the gate 72 is open. The control signal or pulse 811 passes through the open gate 72 and the amplifier 723 to the ignition electrode 534 of the tube 53. The tube 53 is then ignited. Simultaneously, the control voltage in the second control signal supply line 82 opens the gates 61 and 62. The cathode of the tube 53 then provides a positive initial voltage through the open gate 62 to the ignition electrodes 443, 453 and 463 of the tubes 44, 45 and 46, respectively. Each of the tubes 44, 45 and 46 is then ignited by the pulse from the associated pulse source 445, 455 and 465 and by the square wave voltage from the associated square wave voltage source 844, 854 and 864, respectively. In such manner, the first half cycle of the single-phase current upon energization of the power supply circuit is of negative polarity whereas the half cycle at which said power supply circuit was deenergized was positive and this prevents the generation of overcurrents in the transformer 2. The ring counter circuit 5 then switches over to the tube 54, whereupon the cold cathode tubes 44, 45 and 46, the thyratrons 34, 35 and 36 and the ignitrons 14, 15 and 16 then extinguish in the same manner as described for the cold cathode tubes 41, 42 and 43, the thyratrons 31, 32 and 33, and the ignitrons 11, 12 and 13, respectively. The ring counter circuit 5 then switches over to the tube 51. The tube 51 then again aids in providing a positive half cycle of the single-phase current. Upon further switching of the ring counter 5 over to the tube 52 and then to the tube 53, a negative half cycle of the single-phase current is provided, and so forth. This procedure is repeated as long as control voltage is provided by the second control signal supply line 82.

If the last half cycle of the single-phase alternating current prior to the deenergization of the power supply circuit was a negative half cycle, the tube 91 of the flip-flop circuit 9 is conductive and the tube 92 is non-conductive after the single-phase current is discontinued. The gate 71 is then open and the gate 72 is closed. When the single-phase current is continued, the control signal or pulse 811 passes through the open gate 71 and the amplifier 713 to the ignition electrode 514 of the tube 51. The tube 51 is then ignited and provides a positive initial voltage through the open gate 61 for the ignition electrodes 413, 423 and 433 of the respective cold cathode tubes 41, 42 and 43. The gate 61 is opened by the control voltage in the second control signal supply line 82. The tubes 41, 42 and 43 then aid in providing a positive half cycle of the single-phase current via the thyratrons 31, 32 and 33 and the ignitrons 11, 12 and 13 in the described manner.

Thus, when the single-phase current is continued (that is, when the power supply circuit is energized), said single-phase current always begins with a half cycle whose polarity is opposite to the polarity of the half cycle present when said single-phase current was discontinued (that is, when the power supply circuit was deenergized). In this manner, the direction of magnetization of the core 20 of the transformer 2 is reversed whenever the single-phase current is continued, so that the change in induction produces a strong countervoltage which prevents the generation of overcurrents at the time of energization of the power supply circuit.

The ring counter circuit 5 can continue its operation during the intervals in the single-phase current. If the length of the interval between the times of continuation and discontinuation of the single-phase current does not equal a whole multiple of the duration period of the single-phase current, one of the tubes 52, 53 and 54 is ignited, if at the time of continuation the tube 51 is ignited. One of the tubes 51, 52 and 54 is ignited if, at the time of continuation of the single-phase current, the tube 53 is ignited. The ignition of the tube 51 or 53 causes the ignited tube to be extinguished, that is, the system passes through the ring counter stages from the previously ignited tube to the newly ignited tube 51 or 53. However, the ring counter circuit 5 can also be disconnected at the time that the single-phase current is disconnected or discontinued. In such instance, the stepwise switching operation of the ring counter circuit begins with the ignited tube 51 or 53 when the single-phase current is continued.

The integrator circuit 93, through which the flip-flop ciruciit 9 is controlled by the single-phase current, functions to prevent peak voltages from occurring at the time that the transformer 2 is energized or peak voltages produced by certain phenomena at the secondary winding 22 of said transformer. Such peak voltages could interfere with the control of the condition of the flip-flop circuit by the single-phase current.

Instead of the flip-flop circuit 9 and the gates 71 and 72, a polarized relay may be utilized. FIG. 2 illustrates a portion of the circuit arrangement of FIG. 1 modified by the provision of a polarized relay. Similar components in FIGS. 1 and 2 are identified by the same reference numerals.

In FIG. 2, a resistance 24 is connected in series with the transformer 2, and the winding 251 of polarized relay 25 is connected to a point common to said transformer and said resistance. The polarized relay 25 has a make-break contact comprising an armature 252 and two contacts 253 and 254. The armature 252 is connected to the first control signal supply line 81. The contact 253 is connected to the input of the amplifier 713 and the output of said amplifier is connected to the ignition electrode 514 of the tube 51 of the ring counter circuit 5 (not shown in FIG. 2). The contact 254 is connected to the input of the amplifier 723 and the output of said amplifier is connected to the ignition electrode 534 of the tube 53 of the ring counter circuit 5 (not shown in FIG. 2). The excitation coil 251 of the polarized relay 25 is poled in such a way that the armature 252 moves into contact with the contact 254 upon the occurrence of each positive half cycle of the single-phase current and said armature contacts the contact 253 upon the occurrence of each negative half cycle of the single-phase current.

The operation of the circuit of FIG. 2 corresponds to the operation of the circuit of FIG. 1 except that the first control signal supply line 81 is not connected to the second ignition electrodes 534 and 514 of the tubes 53 and 51, respectively, through the respective gates 71 and 72 controlled by the flip-flop circuit 9. Instead, the first control signal supply line 81 is connected to the second ignition electrodes 534 and 514 by the armature 252, which armature connects said line with the second ignition electrode 534 of the tube 53 under the control of the excitation winding 251 and each positive half cycle of the single-phase A.C. current and with the second ignition electrode 514 of the tube 51 under the control of said excitation winding and each negative half cycle of the single-phase A.C. current.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A current control circuit arrangement comprising, in combination,
   first phase converting means for converting a multi-phase alternating current to a half cycle of positive polarity of single-phase alternating current and having an input, an output and an energization control;
   second phase converting means for converting a multi-phase alternating current to a half cycle of negative polarity of single-phase alternating current and having an input, an output and an energization control;
   means for supplying a multiphase alternating current to the inputs of said first and second phase converting means;
   transformer means connected to the outputs of said first and second phase converting means;
   phase converting control means for alternately energizing said first and second phase converting means and having inputs and outputs connected to the energization controls of the said first and second phase converting means, said phase converting control means comprising a ring counter circuit including a first stage having input means and output means and a second stage connected diametrically opposite said first stage and having input means and output means, the input means of said first and second stages constituting the inputs of said phase converting control means and the output means of the said first and second stages constituting the outputs of the said phase converting control means; and
   control means for controlling in accordance with said single-phase alternating current said phase converting control means to initially energize upon energization of said transformer means by one of said first and second phase converting means that one of the said first and second phase converting means producing a single-phase alternating current of opposite half cycle polarity from the last half cycle polarity of the single-phase alternating current produced upon the previous deenergization of the said transformer means, said control means having an input connected to the outputs of the said first and second phase converting means and outputs connected to the inputs of said phase converting control means.

2. A current control circuit arrangement comprising, in combination,
   first phase converting means for converting a multi-phase alternating current to a half cycle of positive polarity of single-phase alternating current and having an input, an output and an energization control;
   second phase converting means for converting a multi-phase alternating current to a half cycle of negative polarity of single-phase alternating current and having an input, an output and an energization control;
   means for supplying a multiphase alternating current to the inputs of said first and second phase converting means;
   transformer means connected to the outputs of said first and second phase converting means;
   a ring counter circuit for alternately energizing said first and second phase converting means, said ring counter circuit including a first stage having input means and output means and a second stage connected diametrically opposite said first stage and having input means and output means, first coupling means coupling the output means of said first stage to the input means of said second stage and second coupling means coupling the output means of said second stage to the input means of said first stage, a first time delay circuit included in said first coupling means and a second time delay circuit included in said second coupling means, said first and second time delay means determining the frequency of said single phase alternating current provided by said first and second phase converting means, the output means of said first stage being connected to the energization control of said first phase converting means and the output means of said second stage being connected to the energization control of said second phase converting means; and
   control means comprising a control signal source providing a starting pulse for starting said single-phase current, a starting pulse supply line connected to said control signal source for supplying said starting pulse, bistable circuit means having an energization control connected to the outputs of said first and second phase converting means and adapted to set said bistable circuit means in a first of two stable conditions when the alternating current half wave delivered by said first and second phase converting means has a positive polarity and to set said bistable circuit means in a second of its two stable conditions when the alternating current half wave delivered by said first and second phase converting means has a negative polarity, and circuit means controlled by said energization control of said bistable circuit means in circuit with said starting pulse supply line and with the input means of the first and second stage of said ring counter circuit and adapted to connect said starting pulse supply line to the input means of the first stage of said ring counter circuit when said bistable circuit means is in the second of its two conditions and to connect said starting pulse supply line to the input means of the second stage of said ring counter circuit when said bistable circuit means is in the first of its two conditions.

3. A current control circuit arrangement, as claimed in claim 2, further comprising a filter circuit having an input and an output, the input of said filter circuit being connected to the output of said first and second phase converting means and the output of said filter circuit being connected to the energization control of said bistable circuit means, said filter circuit being adapted to transmit the frequency of said single-phase current and to suppress frequencies different from the frequency of said single-phase current.

4. A current control circuit arrangement, as claimed in claim 2, further comprising a first gate controlled means connected between the output of the first stage of said ring counter circuit and the energization control of said first phase converting means and second gate controlled means connected between the output of the second stage of said ring counter circuit and the energization control of said second phase converting means, the control signal source of said control means comprising means for supplying a control voltage which is retained for the period of time during which the single-phase alternating current should flow, and a control voltage supply line connected to the control signal source of said control means and to the first and second gate means of said ring counter circuit, the first gate means of said ring counter circuit being conductive between the output of the first stage of said ring counter circuit and the energization control of said first phase converting means and the second gate means of said ring counter circuit being conductive between the output of the second stage of said ring counter circuit and the energization means of said second phase converting means in response to said control voltage.

5. A current control circuit arrangement comprising, in combination,
first phase converting means for converting a multiphase alternating current to a half cycle of positive polarity of single-phase alternating current and having an input, an output and an energization control;
second phase converting means for converting a multiphase alternating current to a half cycle of negative polarity of single-phase alternating current and having an input, an output and an energization control;
means for supplying a multiphase alternating current to the inputs of said first and second phase converting means;
transformer means connected to the outputs of said first and second phase converting means;
a ring counter circuit for alternately energizing said first and second phase converting means and including a first electron discharge stage having first and second ignition electrodes, an anode and a cathode, a second electron discharge stage having first and second ignition electrodes, an anode and a cathode, first and second time delay circuits, first coupling means including said first time delay circuit coupling the cathode of said first stage to the first ignition electrode of said second stage, and second coupling means including said second time delay circuit coupling the cathode of said second stage to the first ignition electrode of said first stage, the cathode of said first stage being connected to the energization control of said first phase converting means and the cathode of said second stage being connected to the energization control of said second phase converting means; and
control means comprising a control signal source providing a starting pulse for starting said single-phase current, a starting pulse supply line connected to said control signal source for supplying said starting pulse, a bistable multivibrator circuit having input means connected to the outputs of said first and second phase converting means and adapted to set said multivibrator circuit in a first of two stable conditions when the alternating current half wave delivered by the outputs of said first and second phase converting means has a positive polarity and to set said multivibrator circuit in a second of its two stable conditions when the alternating current half wave delivered by the outputs of said first and second phase converting means has a negative polarity, output means included in said multivibrator circuit, first gate means connected between said starting pulse supply line and the second ignition electrode of the first stage of said ring counter circuit, first gate control means associated with said first gate means and connected to the output means of said multivibrator circuit and adapted to render said first gate means conducting when said multivibrator circuit is in said second of its two stable conditions, second gate means connected between said starting pulse supply line and the second ignition electrode of the second stage of said ring counter circuit, and second gate control means associated with said second gate means and connected to the output means of said multivibrator circuit and adapted to render said second gate means conducting when said multivibrator circuit is in said first of its two stable conditions.

6. A current control circuit arrangement comprising, in combination,
first phase converting means for converting a multiphase alternating current to a half cycle of positive polarity of single-phase alternating current and having an input, an output and an energization control;
second phase converting means for converting a multiphase alternating current to a half cycle of negative polarity of single-phase alternating current and having an input, an output and an energization control;
means for supplying a multiphase alternating current to the inputs of said first and second phase converting means;
transformer means connected to the outputs of said first and second phase converting means;
a ring counter circuit for alternately energizing said first and second phase converting means and including a first electron discharge stage having first and second ignition electrodes, an anode and a cathode, a second electron discharge stage having first and second ignition electrodes, an anode and a cathode, first and second time delay circuits, first coupling means including said first time delay circuit coupling the cathode of said first stage to the first ignition electrode of said second stage, and second coupling means including said second time delay circuit coupling the cathode of the second stage to the first ignition electrode of said first stage, the cathode of said first stage being connected to the energization control of said first phase converting means and the cathode of said second stage being connected to the energization control of said second phase converting means; and
control means comprising a control signal source providing a starting pulse for starting said single-phase current, a starting pulse supply line connected to said control signal source for supplying said starting signal pulse, polarized relay means having an excitation winding connected to the outputs of said first and second phase converting means, and double throw switching means in circuit with said starting pulse supply line and the second ignition electrode of the first and second stages of said ring counter circuit, said double throw switching means connecting said starting pulse supply line with the second ignition electrode of the first stage of said ring counter circuit when the alternating current half wave delivered by said first and second phase converting means has a negative polarity and connecting said starting pulse supply line with the second ignition electrode of the second stage of said ring counter circuit when the alternating current half wave delivered by said first and second phase converting means has a positive polarity.

References Cited by the Examiner
UNITED STATES PATENTS

| | | | |
|---|---|---|---|
| 2,666,888 | 1/54 | Riley et al. | 323—58 |
| 2,676,297 | 4/54 | Hills et al. | 323—24 X |
| 2,776,399 | 1/57 | Sommeria | 323—58 X |

LLOYD McCOLLUM, *Primary Examiner.*

ORIS L. RADER, *Examiner.*